No. 695,559. Patented Mar. 18, 1902.
W. JACKMOND.
REAMER.
(Application filed Aug. 27, 1901.)
(No Model.)
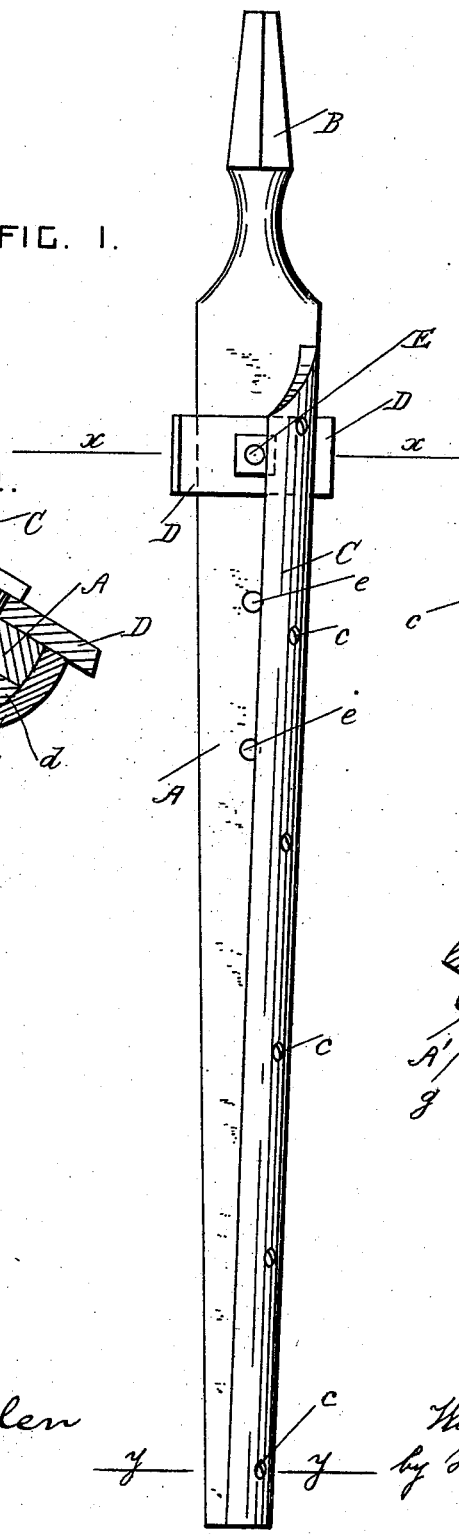
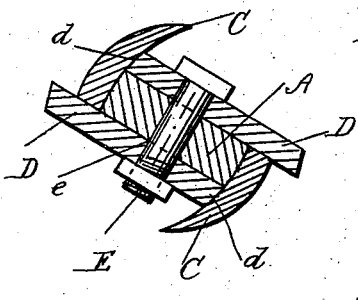
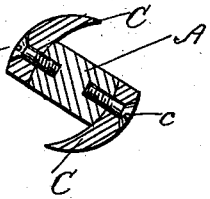
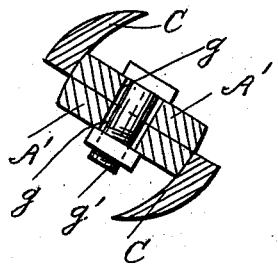
FIG. 1.
FIG. 2.
FIG. 3.
FIG. 4.
WITNESSES
Walter Allen
Wm. H. Bates
INVENTOR
William Jackmond.
by Herbert W. T. Jenner.
Attorney

UNITED STATES PATENT OFFICE.

WILLIAM JACKMOND, OF SHUQUALAK, MISSISSIPPI.

REAMER.

SPECIFICATION forming part of Letters Patent No. 695,559, dated March 18, 1902.

Application filed August 27, 1901. Serial No. 73,476. (No model.)

*To all whom it may concern:*

Be it known that I, WILLIAM JACKMOND, a citizen of the United States, residing at Shuqualak, in the county of Noxubee and State of Mississippi, have invented certain new and useful Improvements in Reamers; and I do hereby declare the following to be a full, clear, and exact description of the invention, such as will enable others skilled in the art to which it appertains to make and use the same.

This invention relates to reamers for the hubs of vehicle-wheels; and it consists in the novel construction and combination of the parts hereinafter fully described and claimed.

In the drawings, Figure 1 is a side view of the reamer. Figs. 2 and 3 are cross-sections taken on the lines $xx$ and $yy$ in Fig. 1. Fig. 4 is a cross-section showing a modification of the reamer.

The reamer has a tapered bar of metal A, and B is a shank at one end of the bar A. The reamer is revolved by any approved hand-wrench, the socket of which will engage with the shank B, or it may be revolved by any approved machine provided with a frame for engaging with the said shank.

C represents curved cutting-knives at the edges of the bar A. These knives may be formed integral with the bar A; but they are preferably forged separate from it and are secured to it by countersunk screws $c$. The knives extend longitudinally of the bar, and their cutting edges project beyond its sides.

D represents two flat knives secured to the bar A, with their cutting edges overlapping the cutting-knives C on one edge of the bar and their heels $d$ bearing against the cutting-knives at the other edges of the bar.

E is a single bolt for securing the two flat knives in position, and $e$ is a series of holes in the bar A, so that the knives D can be secured by the bolt E to the bar A in different positions to suit different hubs.

In the modification shown in Fig. 4 the bar A is made of two similar parts A', provided with slots $g$ and bolts $g'$ for clamping them together.

The parts A' can be slid on each other and clamped with the cutting-knives at different distances apart, so that an expansible reamer is formed.

What I claim is—

1. In a reamer, the combination, with a tapered bar provided with curved cutting-knives at its edges which project over its sides, of two flat knives secured to the sides of the said bar with their cutting edges overlapping the said curved cutting-knives, substantially as set forth.

2. In a reamer, the combination, with a tapered bar provided with curved cutting-knives at its edges which project over its sides and a series of holes extending through it, of two flat knives having their heels bearing against the said curved cutting-knives and their cutting edges projecting over them, and a single bolt engaging with any of the said holes and securing the said flat cutting-knives to the bar, substantially as set forth.

3. In a reamer, the combination, with a tapered bar formed of two adjustable parts secured side by side, of curved cutting-knives secured to the edges of the said bar and projecting over its sides, and two flat knives secured to the sides of the said bar with their cutting edges overlapping the said curved cutting-knives, substantially as set forth.

In testimony whereof I affix my signature in presence of two witnesses.

WM. JACKMOND.

Witnesses:
W. I. HUBBARD,
J. H. HUBBARD.